(12) United States Patent
Lewis et al.

(10) Patent No.: US 12,373,844 B2
(45) Date of Patent: Jul. 29, 2025

(54) ADAPTIVE MACHINE LEARNING THRESHOLD

(71) Applicant: Stripe, Inc., South San Francisco, CA (US)

(72) Inventors: Michael Lewis, Santa Cruz, CA (US); Alexandre Franck Bondoux, Philadelphia, PA (US)

(73) Assignee: Stripe, Inc., South San Francisco, CA (US)

( * ) Notice: Subject to any disclaimer, the term of this patent is extended or adjusted under 35 U.S.C. 154(b) by 227 days.

(21) Appl. No.: 17/708,631

(22) Filed: Mar. 30, 2022

(65) Prior Publication Data

US 2023/0316292 A1 Oct. 5, 2023

(51) Int. Cl.
 *G06Q 40/00* (2023.01)
 *G06N 20/20* (2019.01)
 *G06Q 20/40* (2012.01)

(52) U.S. Cl.
 CPC ........... *G06Q 20/409* (2013.01); *G06N 20/20* (2019.01); *G06Q 20/401* (2013.01)

(58) Field of Classification Search
 CPC .... G06Q 20/409; G06Q 20/401; G06N 20/20; G06N 3/09; G06N 3/096; G06N 3/045
 See application file for complete search history.

(56) References Cited

U.S. PATENT DOCUMENTS

| | | | | |
|---|---|---|---|---|
| 10,868,672 B1 * | 12/2020 | Farrugia | ............... | H04L 9/0861 |
| 11,715,465 B2 * | 8/2023 | Ahmadidaneshashtiani | ................ | G06F 40/284 |
| | | | | 704/257 |
| 11,934,948 B1 * | 3/2024 | Ferguson-Walter | ... | G06N 3/045 |
| 2008/0140576 A1 * | 6/2008 | Lewis | ..................... | G06Q 30/02 |
| | | | | 707/999.107 |
| 2018/0046796 A1 * | 2/2018 | Wright | .................... | G06F 21/45 |
| 2018/0308025 A1 * | 10/2018 | Bansal | ...................... | G06N 3/02 |
| 2019/0222602 A1 * | 7/2019 | Linder | .............. | G06F 16/24578 |
| 2019/0258807 A1 * | 8/2019 | DiMaggio | ............. | G06F 21/577 |
| 2021/0049623 A1 * | 2/2021 | Luo | ......................... | G06Q 50/40 |
| 2022/0046047 A1 * | 2/2022 | Lewis | .................... | G06F 21/554 |
| 2022/0201042 A1 * | 6/2022 | Crabtree | ............. | G06F 16/2477 |
| 2022/0207352 A1 * | 6/2022 | Barr | ........................ | G06F 17/18 |

(Continued)

FOREIGN PATENT DOCUMENTS

CA 3078658 A1 * 11/2020 ......... H04L 63/0236

OTHER PUBLICATIONS

Ganju et al: "Property Inference Attacks on Fully Connected Neural Networks using Permutation Invariant Representations" CCS '18: Proceedings of the 2018 ACM SIGSAC Conference on Computer and Communications Security, Toronto, ON, Canada, Oct. 15-19, 2018 (Year: 2018)*

*Primary Examiner* — Edward J Baird (74) *Attorney, Agent, or Firm* — Foley & Lardner LLP (57) ABSTRACT

In an example embodiment, a solution is provided wherein a threshold used by a classifier in a first machine learning model is dynamically set by a second machine learning model. More particularly, the threshold may be selected from two or more different threshold settings, based on the output of the second machine learning model. This acts to improve the reliability of predictions made by the first machine learning model in certain use cases where circumstances not adequately captured by the first machine learning model can affect the accuracy of the threshold used by the first machine learning model.

12 Claims, 6 Drawing Sheets

(56) References Cited

U.S. PATENT DOCUMENTS

2022/0374274 A1\* 11/2022 Chen .................. G06F 11/3409
2023/0071394 A1\* 3/2023 Roychowdhury ... G05B 23/024
2023/0273981 A1\* 8/2023 Rapowitz ............... G06F 21/31
 726/4

\* cited by examiner

ADAPTIVE MACHINE LEARNING THRESHOLD

TECHNICAL FIELD

The subject matter disclosed herein generally relates to machine learning. More particularly, the subject matter disclosed herein relates to an adaptive machine learning threshold.

BACKGROUND

Machine learning is used in a wide variety of applications. In some applications, a classifier model, trained through machine learning, is used to output one or more classifications of input data. One such example application is in the field of credit card validations. Validations are communications between credit card processors and credit card issuers that ensure that a particular credit card number is valid and the corresponding credit card is still active.

Validations may take the form of a dedicated request to the issuer that does not include an amount, or may include a nominal amount (e.g., $1) and be issued as an authorization request. For purposes of this document, both such instances will be considered to be validations.

There is typically a nominal fee associated with each validation, often paid by either the credit card processor or the merchant. An issue arises, however, when mass credit card fraud is attempted, in that the number of authorizations may be significantly higher than normal, and even with a nominal fee per authorization the cost can get excessive. For example, during a so-called "enumeration attack," a malicious user will attempt authorizations of a large number of different stolen or guessed credit card numbers in a short amount of time. While the credit card issuers typically have processes in place to reduce the success rate of these enumeration attacks by rejecting suspicious charges at the authorization stage, the credit card processor and/or merchant still wind up having to pay for the validations.

Machine learning models could be used to help reduce these fees by operating on the credit card processor-side and determining whether or not to submit a validation for a charge based on a prediction of whether the credit card issuer will indicate the card is valid. Such a model might use a set threshold to make its conclusions. For example, the machine learning model may output a prediction of the likelihood (e.g., a value between 0 and 1 with 1 being absolute certainty of validations and 0 being absolute certainty of rejection) and the threshold may determine whether the prediction is high enough to forego submitting the validation (e.g., if the threshold is 0.5 then charges with prediction values less than 0.5 may have the validation process blocked before it is communicated to the credit card issuer, thus preventing a fee for that validation).

The threshold is predetermined at some value set by the credit card processor or other administrator, with an eye towards balancing the need to avoid blocking validations for legitimate charges while reducing validations for illegitimate charges. Such a static threshold, however, may cause the machine learning model to fail to accurately block or allow validations.

BRIEF DESCRIPTION OF THE DRAWINGS

Some embodiments are illustrated by way of example and not limitation in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, a solution is provided wherein the threshold used by a classifier in a first machine learning model is dynamically set by a second machine learning model. More particularly, the threshold may be selected from two or more different threshold settings, based on the output of the second machine learning model. This acts to improve the reliability of predictions made by the first machine learning model in certain use cases where circumstances not adequately captured by the first machine learning model can affect the accuracy of the threshold used by the first machine learning model.

More particularly, in the specific use case involving credit card validations, the first machine learning model may be termed a "decline model" and may be trained by a first machine learning algorithm to learn how to predict whether or not a particular validation will ultimately be accepted or rejected by the credit card issuer. A threshold may then be used by the decline model in classifying whether the prediction is "accept" or "decline." In the case of "accept", the credit card processor may then proceed with sending the validation request to the credit card issuer. In the case of "decline," the credit card processor may then block the validation request from being sent to the credit card issuer, saving the fees (which would have otherwise been imposed on either the credit card issuer or the merchant).

The second machine learning model may be termed a "real-time card testing model" and may be trained by a second machine learning algorithm to learn how to predict whether or not a merchant to whom an validation request pertains (i.e., the merchant who is attempting to receive funds via a credit card transaction, or at least is considering whether receive funds in the future from a customer) is under an enumeration (or similar) attack. If the real-time card testing model determines that a particular merchant is under an enumeration attack, then a first value may be used for the threshold by the decline model. If the real-time card testing model determines that the particular merchant is not under an enumeration attack, then a second value (different than the first value) may be used for the threshold by the decline model.

Figure 1:
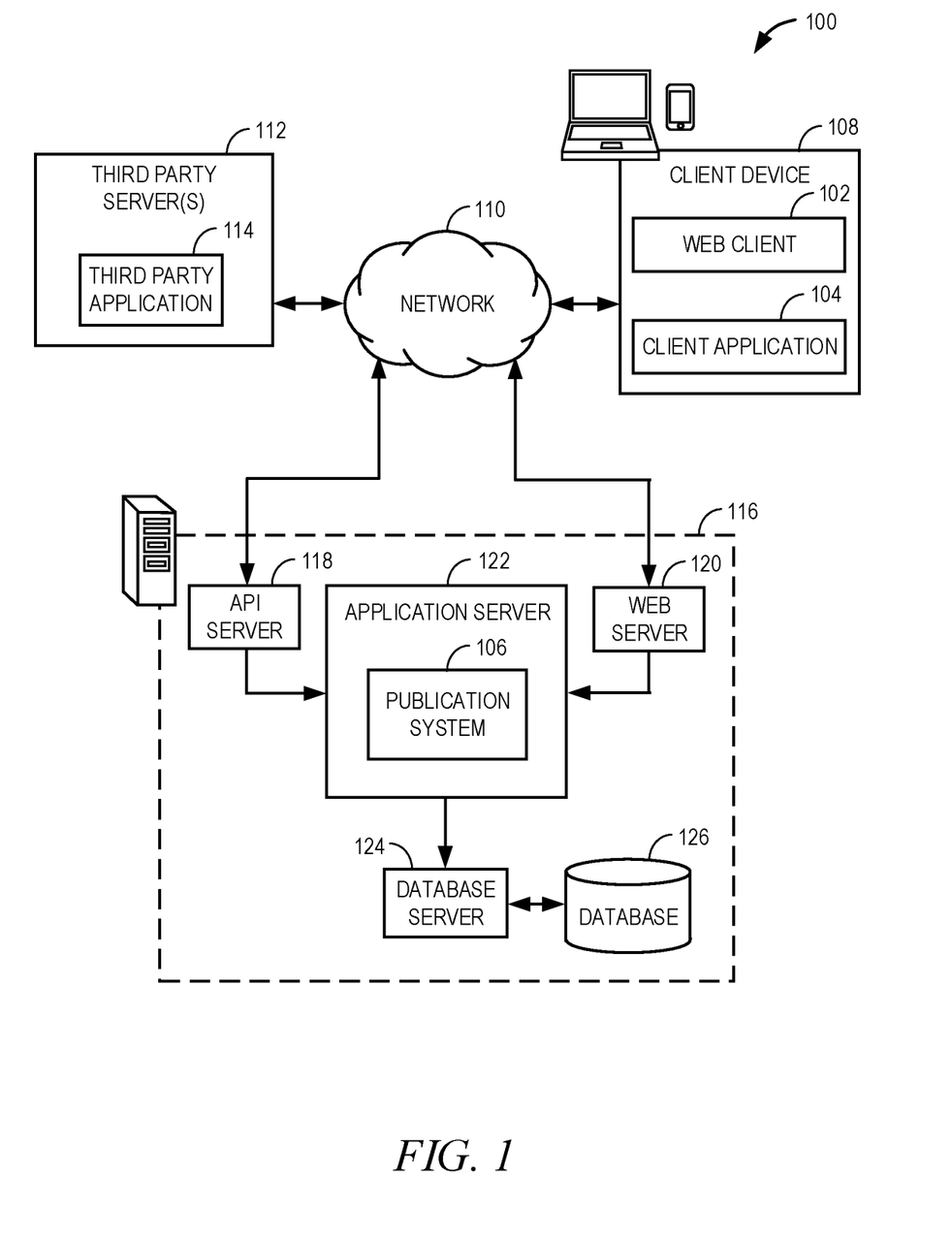
FIG. 1 is a block diagram illustrating a high-level network architecture, according to some example embodiments.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe") as an example of a payment processor) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
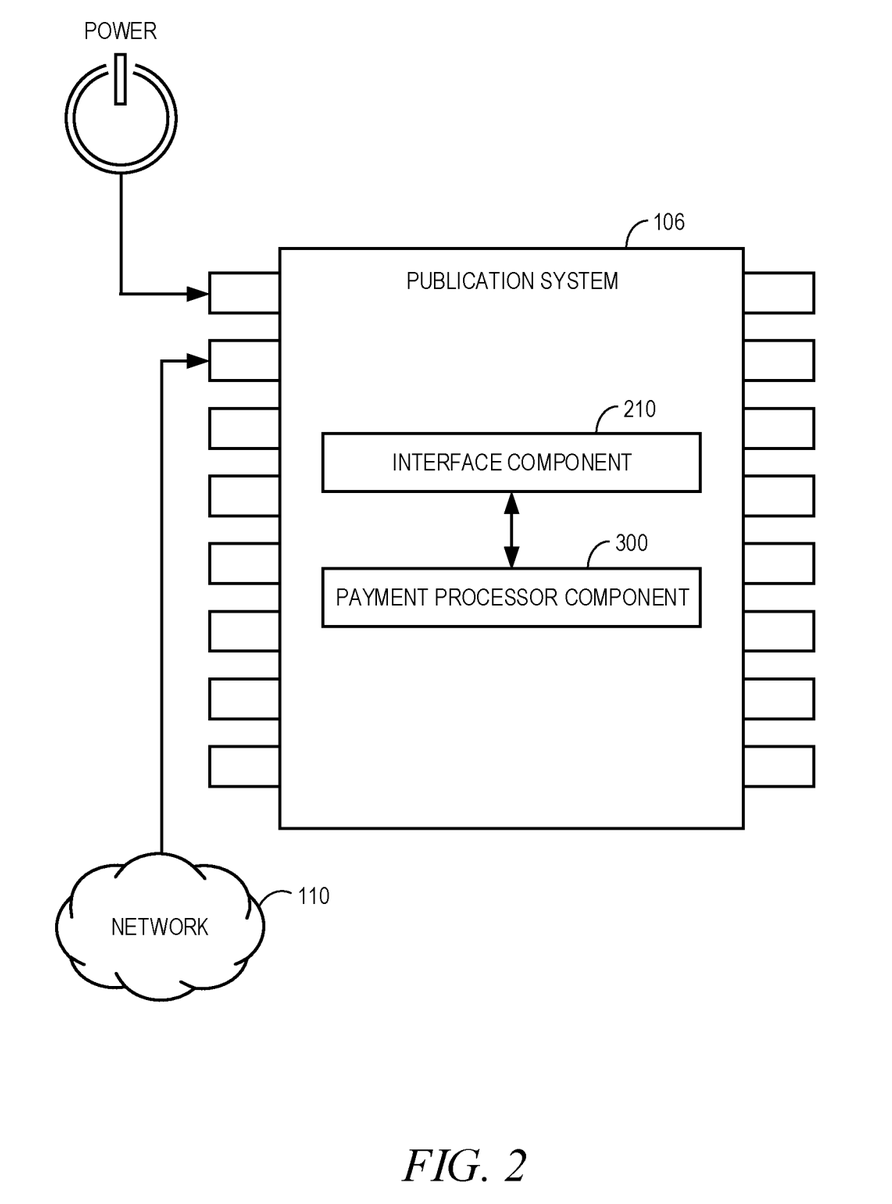
FIG. 2 is a block diagram showing architectural aspects of a publication system, according to some example embodiments.

FIG. 2 is a block diagram showing architectural details of a publication system 106 of FIG. 1, according to some example embodiments. Specifically, the publication system 106 is shown to include an interface component 210 by which the publication system 106 communicates (e.g., over a network 110) with other systems within the SaaS network architecture 100.

Figure 3:
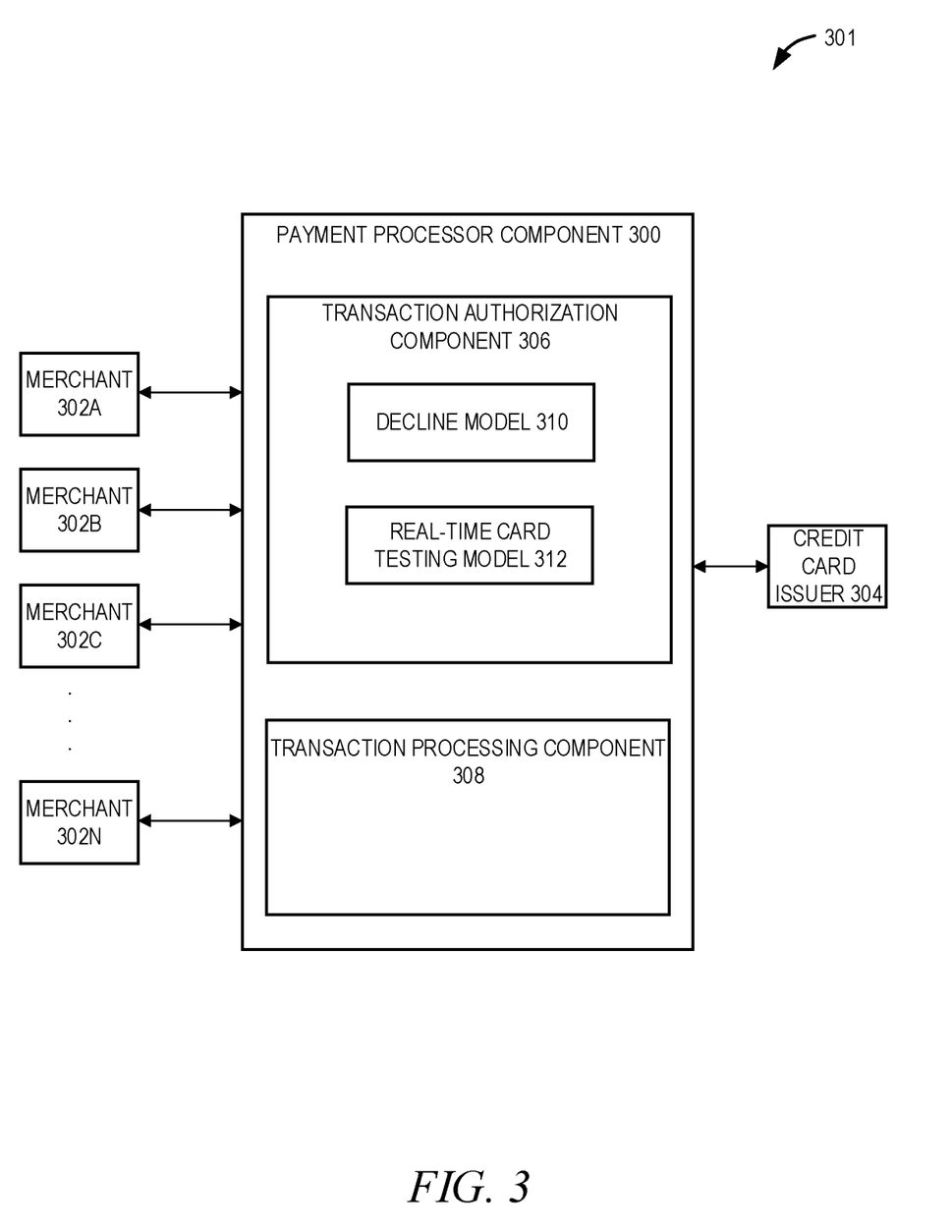
FIG. 3 is a block diagram illustrating a system 301 in accordance with an example embodiment.

The interface component 210 is communicatively coupled to a payment processor component 300 of FIG. 3 that operates to provide payment processing functions for a payment processor in accordance with the methods described herein with reference to the accompanying drawings.

FIG. 3 is a block diagram illustrating a system 301 in accordance with an example embodiment. The system includes the payment processor component 300 from FIG. 2, which communicates with one or more merchants 302A-302N as well as with credit card issuer 304 via network 110. Payment processor component 300 includes a transaction authorization component 306 and a transaction processing component 308. The transaction processing component 308 takes as input information about a potential transaction from a merchant 302A-302N. It then decides whether or not to request validation for the transaction from the credit card issuer 304. As will be explained in more detail below, it utilizes a decline model 310 and a real-time card testing model 312 to make this decision. When validation requests are made, they are sent to the credit card issuer 304, which then make a final decision as to whether to indicate that the credit card is valid, and which then communicates this final decision to the payment processor component 300.

Separately, once the potential transaction has been accepted (via an accept on a separate authorization request), the transaction processing component 308 processes the payment itself, via communication with the credit card issuer 304.

The decline model 310 is a machine learning model trained by a first machine learning algorithm to predict whether or not the final decision by the credit card issuer 304 will be an accept or decline, for an input validation request under consideration.

The first machine learning algorithm may iterate among various parameters, changing parameters (weights) multiplied by various input variables and evaluating a loss function at each iteration, until the loss function is minimized, at which stage the parameters for that stage are learned. The training data may include manually labeled data. Specifically, the weights are multiplied by the input variables as part of a weighted sum operation, and the weighted sum operation is used by the loss function.

The first machine learning algorithm may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the first machine learning algorithm is an XG Boost machine learning algorithm. XG Boost supports a gradient boosting algorithm, stochastic gradient boosting, and regularized gradient boosting. It makes efficient use of compute time and memory resources, and is sparse-aware (about to automatically handle missing data values), supporting block structure (which allows the parallelization of tree construction), and supporting retraining.

In other example embodiments, the first machine learning algorithm is a deep neural network, or a combination of deep neural network components and XG Boost components.

The machine learning model can also be retrained by passing new training data, some of which may have been labeled via user feedback, to the machine learning algorithm at a later time. In some example embodiment, a passthrough set is used. Specifically, a small percent of validation requests are sent to the credit card issuer regardless of their score, even when above the chosen threshold, so the model's performance can be measured.

Features used by the first machine learning algorithm (as well as by the trained decline model) may include, but are not limited to, time features (day of week, hour of day, timezone, etc.), customer data (email address, billing address, time since created, etc.), client data (Internet Protocol address, request headers, browser, operating system, session identification, etc.), card metadata (bank identification number (BIN), bank, country, prepaid, debit or credit, etc.), payment data (amount, currency, shipping address, etc.), and historical counters across many dimensions (card, email address, customer, merchant, IP address, etc.).

The first machine learning algorithm may utilize training data that has been labeled by actual decisions made by the credit card issuer in the past. More particularly, validation data, including some or all of the features described above, may be labeled as having been an "accept" or a "decline" validation from the credit card issuer. This helps train the decline model to predict the likelihood of the credit card issuer accepting or declining a particular validation request.

Similar to the first machine learning algorithm, the second machine learning algorithm may also be selected from among many other different potential supervised or unsupervised machine learning algorithms. In an example embodiment, the second machine learning algorithm uses the same type of model (e.g., XG Boost) as the first machine learning algorithm, and also uses the same features as input. This is not, however, mandatory, and embodiments are foreseen where the first machine learning algorithm uses a different type of model and/or different features than the second machine learning algorithm.

As with the first machine learning algorithm, in some example embodiments the second machine learning algorithm is a deep neural network, or a combination of deep neural network components and XG Boost components.

Furthermore, the second machine learning algorithm at least differs from the first machine learning algorithm in the labels used on its corresponding training data. While the first machine learning algorithm used actual results from the credit card issuer as labels, the second machine learning algorithm uses labels indicative of a judgment as to whether an enumeration attack occurred. In some instances, this may be hand-generated labels by an expert able to deduce whether an enumeration attack occurred on a merchant at the time the corresponding validation was attempted. In other instances, these labels may be generated by a separate model trained by a third machine learning algorithm to recognize features of an enumeration attack. Alternatively, one or more heuristics may be used to generate the labels, such as traffic is multiple standard deviations away from their hourly average of the last 6 months, merchant rolled their security keys, and merchant reported an attack.

As mentioned briefly above, the real-time card testing model 312 may be trained by the second machine learning algorithm to learn how to predict whether or not a merchant to whom a validation request pertains (i.e., the merchant who is attempting to receive funds via a credit card transaction) is under an enumeration attack (or similar). If the real-time card testing model 312 determines that a particular merchant is under an enumeration attack, then a first value may be used for the threshold by the decline model. If the real-time card testing model 312 determines that the particular merchant is not under an enumeration attack, then a second value (different than the first value) may be used for the threshold by the decline model. It should be noted that this embodiment is one where the classifier in the real-time card testing model 312 classifies the prediction into one of two categories: under enumeration attack or not under enumeration attack. In other example embodiments, more than two categories may be used. In other example embodiments, the categories may be replaced with a continuous rating scale (e.g., between 0 and 1) indicating the likelihood that the particular merchant is under attack, and the threshold may be a computed value using a function that uses that rating as one of the variables. This continuous rating can vary over time and be readjusted periodically (e.g., every minute).

Figure 4:
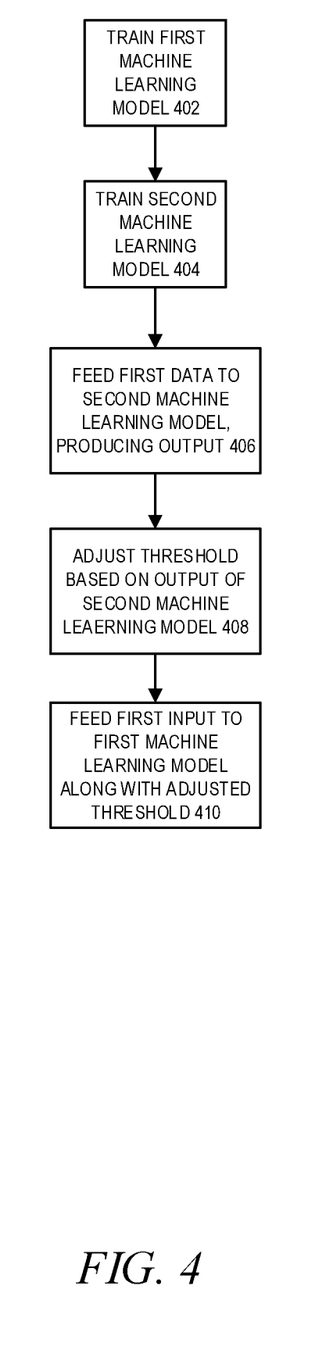
FIG. 4 is a flow diagram illustrating a method for training multiple machine learning models, in accordance with an example embodiment.

FIG. 4 is a flow diagram illustrating a method 400 for training multiple machine learning models, in accordance with an example embodiment. At operation 402, a first machine learning model is trained using a first machine learning algorithm, the first machine learning model being a classifier model, having a first threshold used to classify predictions made by the first machine learning model into categories. At operation 404, a second machine learning model is trained using a second machine learning algorithm.

At operation 406, a first input is fed to the second machine learning model, producing an output. At operation 408, the threshold is adjusted based on the output of the second machine learning model. At operation 410, the first input is fed to the first machine learning model along with the adjusted threshold, the first machine learning model using the adjusted threshold to classify a prediction made for the first input. 406-410 may repeat themselves endlessly in a loop.

Figure 5:
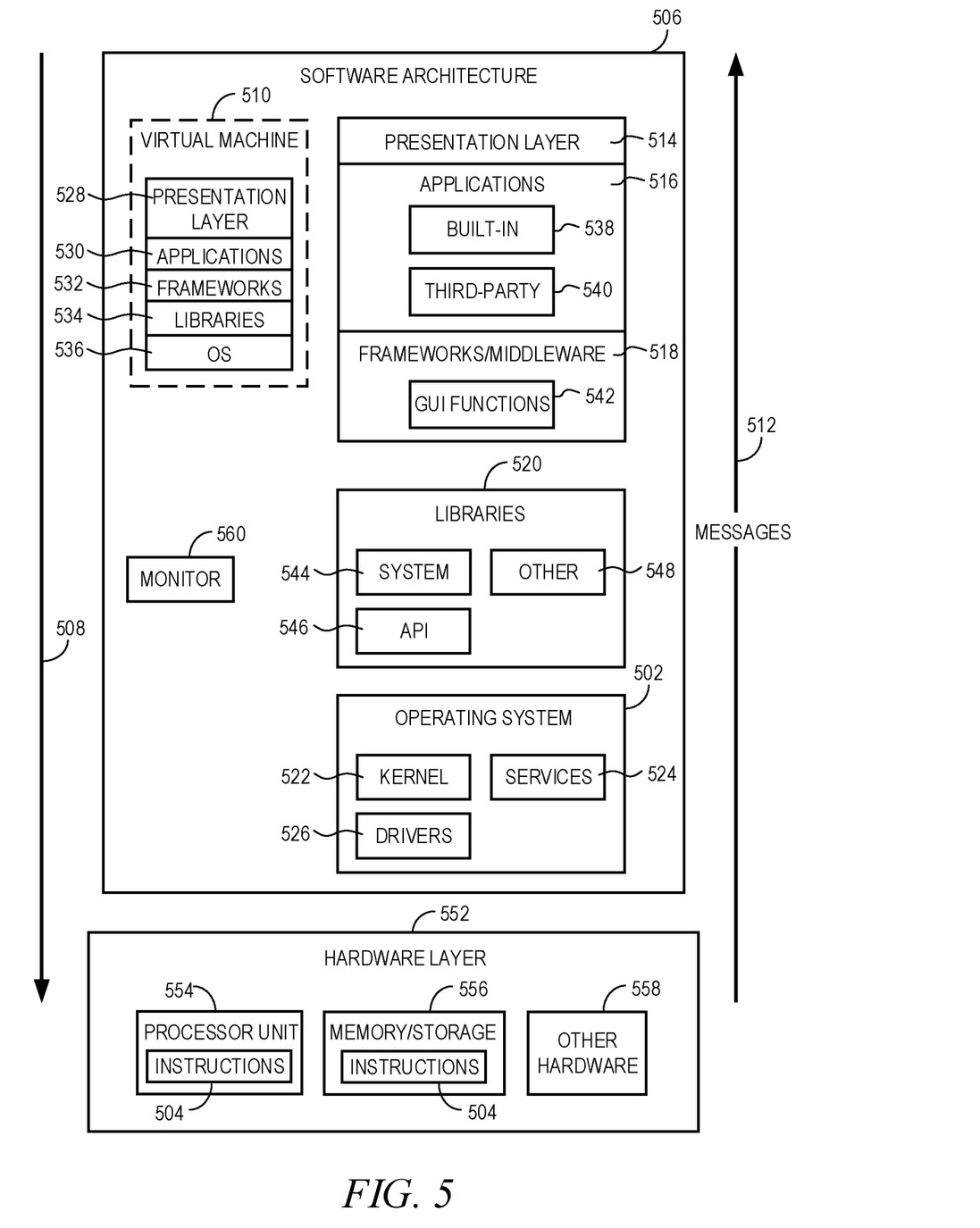
FIG. 5 is a block diagram illustrating an example software architecture, which may be used in conjunction with various hardware architectures herein described.

FIG. 5 is a block diagram illustrating an example software architecture 506, which may be used in conjunction with various hardware architectures herein described. FIG. 5 is a non-limiting example of a software architecture 506, and it will be appreciated that many other architectures may be implemented to facilitate the functionality described herein. The software architecture 506 may execute on hardware such as a machine 600 of FIG. 6 that includes, among other things, processors 604, memory/storage 606, and input/output (I/O) components 618. A representative hardware layer 552 is illustrated and can represent, for example, the machine 600 of FIG. 6. The representative hardware layer 552 includes a processor 554 having associated executable instructions 504. The executable instructions 504 represent the executable instructions of the software architecture 506, including implementation of the methods, components, and so forth described herein. The hardware layer 552 also includes memory and/or storage modules as memory/storage 556, which also have the executable instructions 504. The hardware layer 552 may also comprise other hardware 558.

In the example architecture of FIG. 5, the software architecture 506 may be conceptualized as a stack of layers where each layer provides particular functionality. For example, the software architecture 506 may include layers such as an operating system 502, libraries 520, frameworks/middleware 518, applications 516, and a presentation layer 514. Operationally, the applications 516 and/or other components within the layers may invoke API calls 508 through the software stack and receive a response as messages 512 in response to the API calls 508. The layers illustrated are representative in nature, and not all software architectures have all layers. For example, some mobile or special-purpose operating systems may not provide a frameworks/middleware 518, while others may provide such a layer. Other software architectures may include additional or different layers.

The operating system 502 may manage hardware resources and provide common services. The operating system 502 may include, for example, a kernel 522, services 524, and drivers 526. The kernel 522 may act as an abstraction layer between the hardware and the other software layers. For example, the kernel 522 may be responsible for memory management, processor management (e.g., scheduling), component management, networking, security settings, and so on. The services 524 may provide other common services for the other software layers. The drivers 526 are responsible for controlling or interfacing with the underlying hardware. For instance, the drivers 526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 520 provide a common infrastructure that is used by the applications 516 and/or other components and/or layers. The libraries 520 provide functionality that allows other software components to perform tasks in an easier fashion than by interfacing directly with the underlying operating system 502 functionality (e.g., kernel 522, services 524, and/or drivers 526). The libraries 520 may include system libraries 544 (e.g., C standard library) that may provide functions such as memory allocation functions, string manipulation functions, mathematical functions, and the like. In addition, the libraries 520 may include API libraries 546 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 5D graphic content on a display), database libraries (e.g., SQLite that may provide various relational database functions), web libraries (e.g., WebKit that may provide web browsing functionality), and the like. The libraries 520 may also include a wide variety of other libraries 548 to provide many other APIs to the applications 516 and other software components/modules.

The frameworks/middleware 518 provide a higher-level common infrastructure that may be used by the applications 516 and/or other software components/modules. For example, the frameworks/middleware 518 may provide various graphic user interface (GUI) functions 542, high-level resource management, high-level location services, and so forth. The frameworks/middleware 518 may provide a broad spectrum of other APIs that may be utilized by the applications 516 and/or other software components/modules, some of which may be specific to a particular operating system or platform.

The applications 516 include built-in applications 538 and/or third-party applications 540. Examples of representative built-in applications 538 may include, but are not limited to, a contacts application, a browser application, a book reader application, a location application, a media application, a messaging application, and/or a game application. The third-party applications 540 may include any application developed using the ANDROID™ or IOS™ software development kit (SDK) by an entity other than the vendor of the particular platform and may be mobile software running on a mobile operating system such as IOS™ ANDROID™, WINDOWS® Phone, or other mobile operating systems. The third-party applications 540 may invoke the API calls 508 provided by the mobile operating system (such as the operating system 502) to facilitate functionality described herein.

The applications 516 may use built-in operating system functions (e.g., kernel 522, services 524, and/or drivers 526), libraries 520, and frameworks/middleware 518 to create user interfaces to interact with users of the system. Alternatively, or additionally, in some systems, interactions with a user may occur through a presentation layer, such as the presentation layer 514. In these systems, the application/component "logic" can be separated from the aspects of the application/component that interact with a user.

Some software architectures use virtual machines. In the example of FIG. 5, this is illustrated by a virtual machine 510. The virtual machine 510 creates a software environment where applications/components can execute as if they were executing on a hardware machine (such as the machine 600 of FIG. 6, for example). The virtual machine 510 is hosted by a host operating system (e.g., the operating system 502 in FIG. 5) and typically, although not always, has a virtual machine monitor 560, which manages the operation of the virtual machine 510 as well as the interface with the host operating system (e.g., the operating system 502). A software architecture executes within the virtual machine 510 such as an operating system (OS) 536, libraries 534, frameworks 532, applications 530, and/or a presentation layer 528. These layers of software architecture executing within the virtual machine 510 can be the same as corresponding layers previously described or may be different.

Figure 6:
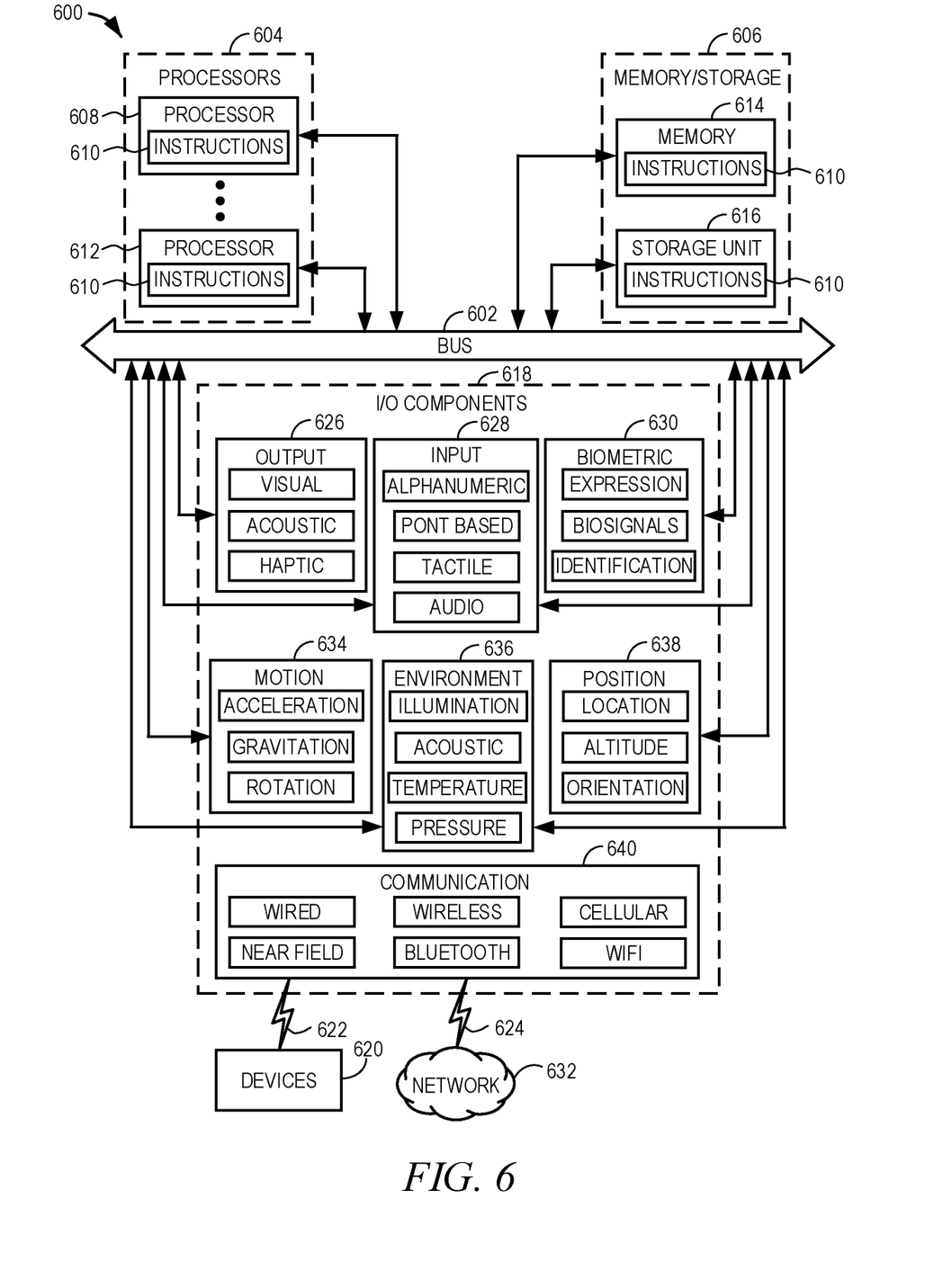
FIG. 6 is a block diagram illustrating components of a machine, according to some example embodiments, that is able to read instructions from a machine-readable medium (e.g., a machine-readable storage medium) and perform any one or more of the methodologies discussed herein.

FIG. 6 is a block diagram illustrating components of a machine 600, according to some example embodiments, that is able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 610 (e.g., software, a program, an application, an applet, an app, or other executable code) for causing the machine 600 to perform any one or more of the methodologies discussed herein may be executed. As such, the instructions 610 may be used to implement modules or components described herein. The instructions 610 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies discussed herein.

The machine 600 may include processors 604 (including processors 608 and 612), memory/storage 606, and I/O components 618, which may be configured to communicate with each other such as via a bus 602. The memory/storage 606 may include a memory 614, such as a main memory or other memory storage, and a storage unit 616, both accessible to the processors 604 such as via the bus 602. The storage unit 616 and memory 614 store the instructions 610 embodying any one or more of the methodologies or functions described herein. The instructions 610 may also reside, completely or partially, within the memory 614, within the storage unit 616, within at least one of the processors 604 (e.g., within the processor's cache memory), or any suitable combination thereof, during execution thereof by the machine 600. Accordingly, the memory 614, the storage unit 616, and the memory of the processors 604 are examples of machine-readable media.

The I/O components 618 may include a wide variety of components to receive input, provide output, produce output, transmit information, exchange information, capture measurements, and so on. The specific I/O components 618 that are included in a particular machine will depend on the type of machine. For example, portable machines such as mobile phones will likely include a touch input device or other such input mechanisms, while a headless server machine will likely not include such a touch input device. It will be appreciated that the I/O components 618 may include many other components that are not shown in FIG. 6. The I/O components 618 are grouped according to functionality merely for simplifying the following discussion; the grouping is in no way limiting. In various example embodiments, the I/O components 618 may include output components 626 and input components 628. The output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 618 may include biometric components 630, motion components 634, environment components 636, or position components 638, among a wide array of other components. For example, the biometric components 630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 634 may include acceleration sensor components (e.g., accelerometer), gravitation sensor components, rotation sensor components (e.g., gyroscope), and so forth. The environment components 636 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 638 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 618 may include communication components 640 operable to couple the machine 600 to a network 632 or devices 620 via a coupling 624 and a coupling 622, respectively. For example, the communication components 640 may include a network interface component or other suitable device to interface with the network 632. In further examples, the communication components 640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 620 may be another machine or any of a wide variety of peripheral devices (e.g., a peripheral device coupled via a USB).

Moreover, the communication components 640 may detect identifiers or include components operable to detect identifiers. For example, the communication components 640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640, such as location via Internet Protocol (IP) geo-location, location via Wi-Fi® signal triangulation, location via detecting an NFC beacon signal that may indicate a particular location, and so forth.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" is a company (often a third party) appointed to handle payment card (e.g., credit card, debit card) transactions. They have connections to various card networks and supply validation and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association—branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant and merchant servers are associated with the merchant site. The merchant site is associated with a client-side application and a server-side application.

"Payment Processor" in this context refers to an entity or a plurality of entities and associated software components and/or hardware components (e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2022, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for using a first neural network to improve operation of a second neural network, comprising:
    training, by one or more processors, the first neural network based on a set of transaction data for a training transaction labeled with an indication that an enumeration attack occurred on a merchant computing device at the time that a validation of the training transaction was attempted;
    training, by the one or more processors, the second neural network based on the set of transaction data used to train the first neural network, wherein the set of transaction data are labeled with an indication that the training transaction was validated by an issuer computing device;
    receiving, by the one or more processors, transaction data for a credit card transaction initiated at the merchant computing device;
    determining, by the one or more processors using the first neural network, the merchant computing device is under a first enumeration attack using the transaction data for the credit card transaction initiated at the merchant computing device;
    adjusting, by the one or more processors, a confidence score threshold of the second neural network based on the determination by the first neural network that the merchant computing device is under the first enumeration attack;
    determining, by the one or more processors using a second neural network, a confidence score that the credit card transaction will be validated by the issuer computing device; and
    blocking, by the one or more processors, the credit card transaction responsive to determining the confidence score is below the adjusted confidence score threshold of the second neural network.

2. The method of claim 1, further comprising training the first neural network and training of the second neural network using the same training data but with different labels.

3. The method of claim 2, wherein the training data used for the training of the second neural network has labels obtained from actual approvals and declines of corresponding validations in the training data by the issuer computing device.

4. The method of claim 2, wherein the training data includes features selected from the group comprising: time features, customer data, client data, and card metadata.

5. A system comprising:
    one or more processors; and
    at least one memory storing instructions that, when executed by at least one processor among the one or more processors, cause the at least one processor to perform operations comprising:
        training a first neural network based on a set of transaction data for a training transaction labeled with an indication that an enumeration attack occurred on a merchant computing device at the time that a validation of the training transaction was attempted;
        training a second neural network based on the set of transaction data used to train the first neural network, wherein the set of transaction data are labeled with an indication that the training transaction was validated by an issuer computing device;
        receiving transaction data for a credit card transaction initiated at the merchant computing device;
        determining, using the first neural network, the merchant computing device is under a first enumeration attack using the transaction data for the credit card transaction initiated at the merchant computing device;
        adjusting a threshold based on the determination that the merchant computing device is under the first enumeration attack;
        determining, using a second neural network, a confidence score that the credit card transaction will be validated by the issuer computing device; and blocking the credit card transaction responsive to determining the confidence score is below the adjusted confidence score threshold.

6. The system of claim 5, further comprising training the first neural network and training the second neural network using the same training data but with different labels.

7. The system of claim 6, wherein the training data used for the training of the second neural network has labels obtained from actual approvals and declines of corresponding validations in the training data by the issuer computing device.

8. The system of claim 6, wherein the training data includes features selected from the group comprising: time features, customer data, client data, and card metadata.

9. A non-transitory machine-readable medium comprising instructions which, when read by a machine, cause the machine to perform operations comprising:
training a first neural network based on a set of transaction data for a training transaction labeled with an indication that an enumeration attack occurred on a merchant computing device at the time that a validation of the training transaction was attempted;
training a second neural network based on the set of transaction data used to train the first neural network, wherein the set of transaction data are labeled with an indication that the training transaction was validated by an issuer computing device;
receiving transaction data for a credit card transaction initiated at the merchant computing device;
determining, using the first neural network, the merchant computing device is under a first enumeration attack using the transaction data for the credit card transaction initiated at the merchant computing device;
adjusting a confidence score threshold based on the determination that the merchant computing device is under the first enumeration attack;
determining, using the second neural network, a confidence score that the credit card transaction will be validated by the issuer computing device; and
blocking the credit card transaction responsive to determining the confidence score is below the adjusted confidence score threshold.

10. The non-transitory machine-readable medium of claim 9, further comprising training the first neural network and training the second neural network using the same training data but with different labels.

11. The non-transitory machine-readable medium of claim 10, wherein the training data used for the training of the second neural network has labels obtained from actual approvals and declines of corresponding validations in the training data by the issuer computing device.

12. The non-transitory machine-readable medium of claim 10, wherein the training data includes features selected from the group comprising: time features, customer data, client data, and card metadata.

\* \* \* \* \*